Figure 1:
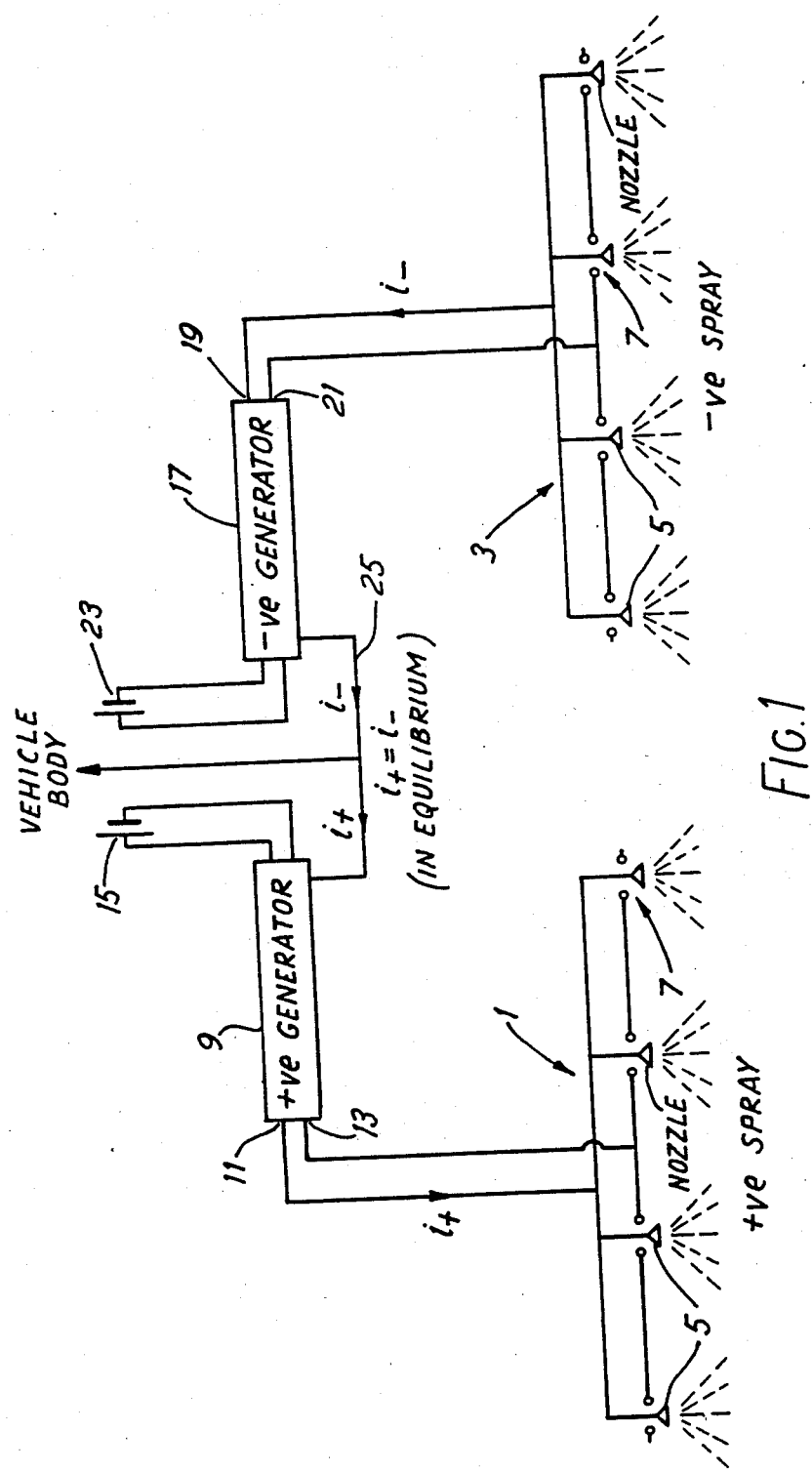

United States Patent [19]

Jackson et al.

[11] Patent Number: 4,703,891
[45] Date of Patent: Nov. 3, 1987

[54] APPARATUS FOR SPRAYING LIQUIDS FROM A MOVING VEHICLE

[75] Inventors: Alistair J. Jackson, Hampshire; Ronald A. Coffee, Surrey, both of England

[73] Assignee: Imperial Chemical Industries PLC, London, England

[21] Appl. No.: 811,440

[22] Filed: Dec. 20, 1985

[30] Foreign Application Priority Data

Dec. 20, 1984 [GB] United Kingdom ............... 8432272

[51] Int. Cl.⁴ .............................................. B05B 5/08
[52] U.S. Cl. .................................... 239/171; 239/172; 239/691; 239/695
[58] Field of Search ................... 239/3, 171, 172, 690, 239/691, 695, 696; 244/1 A, 136; 361/218

[56] References Cited

U.S. PATENT DOCUMENTS

| | | | |
|---|---|---|---|
| 4,328,940 | 5/1982 | Malcolm | 239/171 X |
| 4,467,961 | 8/1984 | Coffee et al. | 239/691 X |
| 4,560,107 | 12/1985 | Inculet | 239/171 X |

FOREIGN PATENT DOCUMENTS 456642 2/1975 U.S.S.R. ............................... 239/695

Primary Examiner—Andres Kashnikow
Attorney, Agent, or Firm—Cushman, Darby & Cushman

[57] ABSTRACT

An apparatus for spraying liquids from a vehicle, suitably an aircraft or other airborne vehicle. The apparatus includes at least two sprayheads, each having adjacent thereto an associated electrode or an associated electrically conducting or semiconducting part of the vehicle. A generator applies potentials to the sprayheads and to the electrodes or conducting or semiconducting parts of the vehicle so that an intense electrical field is developed between the liquid which emerges from each sprayhead and the adjacent electrode or part. The intensity of each field is sufficient to atomise the emerging liquid. The polarities of the applied potentials are such that liquid emerging from one sprayhead is charged positively while liquid emerging from the other sprayhead is charged negatively. Connections to the generator are such that electrical current flows from a target to the generator via spraying liquid and one of the sprayheads and then back to the target via the generator, the other sprayhead and liquid emerging from that other sprayhead.

7 Claims, 3 Drawing Figures

APPARATUS FOR SPRAYING LIQUIDS FROM A MOVING VEHICLE

This invention relates to the spraying of liquids from moving vehicles.

United Kingdom Specification No. 1 569 707 discloses apparatus for spraying pesticides comprising a sprayhead, having a conducting or semiconducting surface and a field adjusting electrode mounted adjacent to the surface. The surface of the sprayhead is charged to an electrical potential of 1 to 20 kilovolts and the field adjusting electrode is maintained at low or earth potential. By suitably positioning the field adjusting electrode relative to the surface of the sprayhead there is a sufficient electrostatic field to cause liquid displaced from the surface to be atomised without corona discharge.

The spraying apparatus disclosed in Specification No. 1 569 707 is hand-held or it can be mounted on a land - or water borne- vehicle. There is therefore no problem in maintaining the sprayhead at the correct potential relative to earth potential and maintaining the field adjusting electrode at earth potential by providing an electrical connection with the ground.

When spraying large areas of crop it is sometimes more convenient to spray from an aircraft. For small areas, where it may be difficult to employ a tractor, an unmanned, remotely controlled, airborne sprayer may be used. In either case, it is no longer possible to maintain the electrical potential on the sprayhead and an earth potential on the field adjusting electrode. Accordingly, there is a build-up in charge such that the potential on the sprayhead falls towards earth potential and the strength of the electrical field between the sprayhead and the field adjusting electrode is reduced. This produces a reduction in charge-to-mass ratio of droplets emerging from the sprayhead, and hence a significant deterioration in spray quality. In the case of a manned aircraft the built-up charge presents a potential hazard when the aircraft returns to ground.

It is an object of the present invention to provide an apparatus for spraying liquids which is suitable for use on an airborne vehicle.

According to the invention there is provided apparatus for spraying a liquid from a vehicle, the apparatus comprising at least two sprayheads, means for generating an electrical potential of a first polarity and an electrical potential of a second polarity, means for applying the electrical potential of the first polarity to liquid which emerges from a first of the sprayheads, means for applying the electrical potential of the second polarity to liquid which emerges from a second of the sprayheads, and means for connecting the generating means to electrically conducting or semiconducting means which, in use, are located adjacent to each sprayhead, whereby there is developed between the liquid which emerges from each sprayhead and the conducting or semiconducting means an electrical field of sufficient intensity to cause atomisation of the liquid, the atomised liquid emerging from the first and second of the sprayheads being charged to the first and second polarities, respectively, wherein electrical connections to the generating means are such that electrical current flows from a target to the generating means via spraying liquid and one of the sprayheads and electrical current then flows back to the target via the generating means, the other of the sprayheads and liquid which emerges from the other of the sprayheads.

The electrically conducting or semiconducting means may comprise at least two field adjusting electrodes, each electrode being associated with and located adjacent to a respective one of the sprayheads. Alternatively, the connecting means may be arranged to connect the generating means to an electrically conducting or semiconducting part of a vehicle upon which the apparatus is mounted in use.

Figure 2:
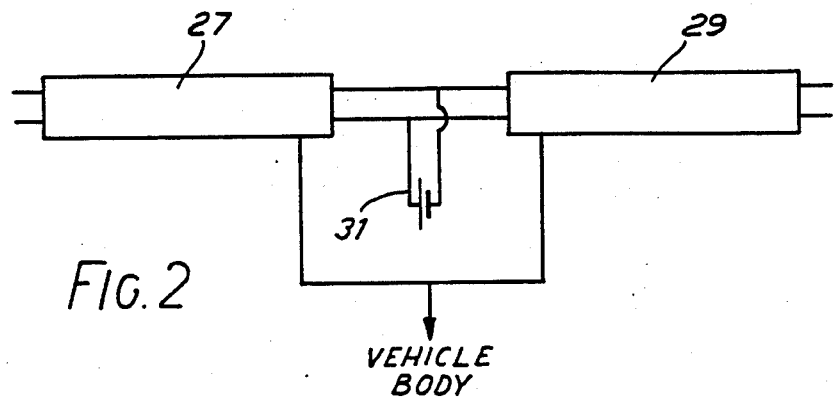
Figure 3:
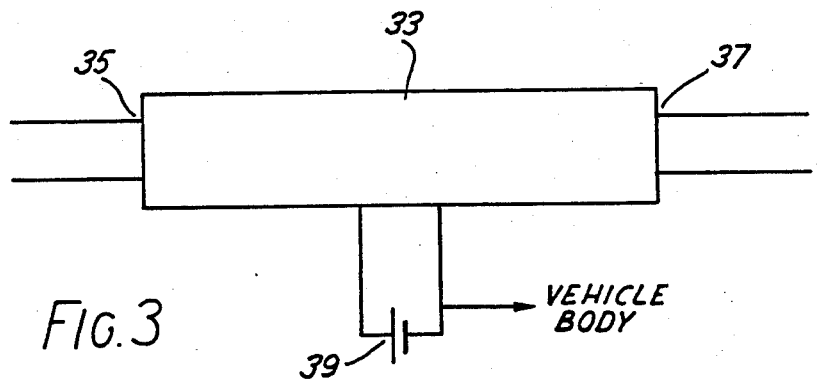

The invention will now be described, by way of example, with reference to the accompanying drawings, in which:

FIG. 1 is a schematic drawing of a first spraying apparatus according to the invention; and FIG. 2 and 3 are schematic drawings of modifications to the apparatus of FIG. 1.

The apparatus shown in FIG. 1 of the drawings is suitable for use in spraying crops from an aircraft.

Referring to FIG. 1, the apparatus includes a first bank 1 of sprayheads 5 and associated field adjusting electrodes 7 which is mounted on one wing of the aircraft. A second bank 3 of sprayheads and associated electrodes is mounted on the other wing. In each bank the sprayheads 5 are arranged in line and spaced so as to provide a suitable spraying pattern.

Each of the sprayheads 5 comprise a nozzle having a surface of electrically conducting or semiconductng material. Each electrode 7 is located adjacent to the conducting or semiconducting surface of the associated sprayhead.

A first electrical generator 9 is provided for applying electrical potentials to the sprayheads 5 and the electrodes 7 of the bank 1. The generator 9 has a first, positive output terminal 11 which is connected to the conducting or semiconducting surface in each sprayhead 5 in the bank 1 and a second output terminal 13 which provides a potential which is negative with respect to the potential from the terminal 11 and which is connected to each of the electrodes 7 in the bank. A battery 15 serves as a low tension supply for the generator 9.

A second electrical generator 17 is likewise provided for the sprayheads 5 and the electrodes 7 in the bank 3. In this case, however, a first negative output terminal 19 of the generator 17 is connected to each of the sprayheads 5 in the bank and a second output terminal 21 provides a potential which is positive with respect to the potential from the terminal 19 and is connected to the associated electrodes 7. A battery 23 provides a low tension supply for the generator 17.

To maintain overall electrical neutrality, as hereinafter described, an electrical connection 25 is made between third terminals of the generators 9 and 17 which would normally be connected to spray current return leads for respective generators.

The location of each electrode 7 relative to the nozzle of the associated sprayhead 5 and the difference in potential between the electrode and the nozzle are such that a strong electrical field is produced at the conducting or semiconducting surface in the nozzle. When the apparatus is in use, liquid is supplied to each sprayhead from a tank (not shown) and is charged by contact with the conducting or semiconducting surface. As the liquid emerges into the air the disruptive forces resulting from the electrical charge thereon are sufficient to overcome the cohesive forces of surface tension, and the liquid is atomised.

It will be appreciated that atomised liquid emerging from the sprayheads 5 in the bank 1 is charged positively, since the conducting or semiconducting surface in each sprayhead is connected to the positive terminal 11 of the generator 9. Liquid emerging from the sprayheads 5 in the bank 3 is charged negatively, however, since each conducting surface of these sprayheads is connected to the negative terminal 19 of the generator 17.

During spraying, positive current flows from the generator 9 to ground via the terminal 11, the conducting or semiconducting surface in the nozzle of each sprayhead 5 of the bank, and the liquid emerging from these sprayheads. In the absence of the connection 25 there would be no return lead for current to flow back to the generator 9 from the ground (ie. the target). Accordingly, a negative charge would build-up on the generator 9. Similarly, a positive charge would build-up on the generator 17.

This build-up of charge on the generators 9 and 17 reduces the potential with respect to the electrodes 7 which is applied to the conducting or semiconducting surfaces in the sprayheads 5, thus reducing the atomising field and the charge applied to the spraying liquid. There is therefore an increase in the size of droplets of the liquid and a deterioration in spraying quality.

Providing the electrical connection 25 results in a continuous path for electrical current, which flows from the terminal 11 of the generator 9, through the sprayheads 5 of the bank 1 and the spraying liquid which emerges from the sprayheads to ground. The current then flows back from the ground via spraying liquid, the sprayheads 5 of the bank 3, the negative terminal of the generator 17, components within the generator 17, the electrical connection 25, and components within the generator 9.

In practice, if one of the generators 9 and 17 supplies more current than the other, a charge builds up on the generators. The polarity of this charge is such as to reduce the atomising field on the sprayheads supplied by the generator supplying the greater current. This reduces the quality of the spray from those sprayheads (ie. the droplets get larger) and the spray current from the generator is also reduced. Likewise, the atomising field on the sprayheads supplied by the other generator (ie. the generator supplying the smaller current) is increased. The quality of the spray from these other sprayheads is therefore improved and the spray current is increased until it matches that from the first generator.

More formally, at mass flow rates $M_1$ and $M_2$ from banks 1 and 2, respectively, the spray currents are $M_1(q/m)1$ and $M_2(q/m)2$, respectively. To maintain electrical neutrality, $$M_1(q/m)1 = M_2(q/m)2$$

In the case of balance conditions, the potentials applied to the sprayheads and to the field adjusting electrodes are automatically adjusted through the build-up charge until $(q/m)1$ and $(q/m)2$ satisfy the above equation.

Referring now to FIG. 2 of the drawings, a modification of the apparatus of FIG. 1 includes generators 27 and 29 which correspond to generators 9 and 17, respectively. In the apparatus of FIG. 2, however, the generators 27 and 29 have a common low voltage supply in the form of a battery 31.

In a second modification of the apparatus of FIG. 1, shown in FIG. 3, the two generators 9 and 17 are replaced by a single generator 33. The generator 33 has a positive output terminal 35 which is connected to the conducting or semiconducting surface in the nozzle of each sprayhead in one bank and a negative output terminal 37 which is connected to the nozzle of each sprayhead in the other bank. Further terminals are connected to the field adjusting electrodes associated with the sprayheads. A battery 39 serves as a low voltage supply for the generator 33. In the apparatus of FIG. 3 the generator 33 has an internal electrical connection corresponding to the connection 25 of FIG. 1.

The apparatus shown in FIGS. 1 to 3 can be used on aircraft or on remotely-controlled, airborne sprayers. Since the spraying liquid emerging from one bank of sprayheads is positively charged and the liquid emerging from the other bank is negatively charged, there is an attraction of the clouds of liquid droplets in the space between the two banks which ensures good coverage of crop below the body of the aircraft or remotely-controlled sprayer.

An apparatus according to the invention may include sprayheads which are not provided with field adjusting electrodes. Instead, the nozzles of the sprayheads are located close to an electrically conducting or semiconducting part of the vehicle, a wing in the case of apparatus mounted on an aircraft. The part is connected to each terminal of the generator or generators which would otherwise be connected to the field adjusting electrodes. Each nozzle is sufficiently close to the associated conducting or semiconducting part for an intense electrical field, sufficient to cause atomisation, to be developed between that part and the liquid emerging from the nozzle.

In the apparatus described above, liquid is supplied from a single tank to the sprayheads in each bank. The two banks of sprayheads are therefore connected by a liquid path which extends through the tank and the pipes connecting the tank to the sprayheads.

In a typical arrangement with a spraying current of 1 $\mu A$ to 10 $\mu A$ the maximum acceptable leakage current through the liquid path is, say, 5 $\mu A$. Assuming there is a potential of 20 KV on each bank of nozzles, approximately 300 cms. of pipes in the liquid path, a pipe diameter of 0.2 cms. one finds that the minimum resistivity of liquid which can be used in the apparatus is approximately $10^6$ ohm cms.

Alternatively, the apparatus could include two separate tanks and delivery circuits. This would eliminate the liquid path for leakage current but would mean increased weight.

In any event, for satisfactory spraying a resistivity of $10^7$ to $10^{10}$ ohm cms. is required.

We claim:

1. Apparatus for spraying a liquid from a vehicle, the apparatus comprising at least two sprayheads, means for generating an electrical potential of a first polarity and an electrical potential of a second polarity, means for applying the electrical potential of the first polarity to liquid which emerges from a first of the sprayheads, means for applying the electrical potential of the second polarity to liquid which emergers from a second of the sprayheads, and means for connecting the generating means to electrically conducting or semiconducting means which, in use, are located adjacent to each sprayhead, whereby there is developed between the liquid which emerges from each sprayhead and the conducting or semiconducting means an electrical field of sufficient intensity to cause atomisation of the liquid, the atomised liquid emerging from the first and second of the sprayheads and being charged to the first and second polarities, respectively, wherein electrical connections to the generating means are such that electrical current flows from a target to the generating means via spraying liquid and one of the sprayheads and electrical current then flows back to the target via the generating means, the other of the sprayheads and liquid which emerges from the other of the sprayheads.

2. Apparatus as claimed in claim 1, wherein the said electrically conducting or semiconducting means comprise at least two field adjusting electrodes, each electrode being associated with and located adjacent to a respective one of the sprayheads.

3. Apparatus as claimed in claim 1, wherein the connecting means are arranged to connect the generating means to an electrically conducting or semiconducting part of a vehicle upon which the apparatus is mounted in use.

4. Apparatus as claimed in claim 1, wherein the generating means comprise first and second electrical generators, each generator having a first output terminal from which the first or second electrical potential is applied to the liquid which emerges from a respective one of the first and second sprayheads, a second output terminal which, in use, is connected to the electrically conducting or semiconducting means, and third terminal which is connected to a third terminal of the other generator by an electrical connection through which the said electrical current flows.

5. Apparatus as claimed in claim 1, wherein the generating means comprise a generator having first output terminals from which respective first and second electrical potentials are applied to the liquid which emerges from respective first and second sprayheads, second output terminals which, in use, are connected to the electrically conducting or semiconducting means, and an internal connection through which the said electrical current flows.

6. Apparatus as claimed in claim 1, wherein each sprayhead comprises a nozzle having a surface of conducting or semiconducting material which, in use, is contacted by liquid which flows through the sprayhead and has the first or second electrical potential applied thereto.

7. Apparatus as claimed in claim 1, comprising a bank of the said first of the sprayheads and a bank of the said second of the sprayheads, each bank comprising a series of sprayheads arranged in line.

* * * * *